US011365309B2

(12) United States Patent
Recker et al.

(10) Patent No.: US 11,365,309 B2
(45) Date of Patent: *Jun. 21, 2022

(54) RUBBER BLEND, SULFUR-CROSSLINKABLE RUBBER MIXTURE, AND VEHICLE TIRE

(71) Applicant: Continental Reifen Deutschland GmbH, Hannover (DE)

(72) Inventors: Carla Recker, Hannover (DE); Catarina Sa, Isernhagen (DE); Kathrin Wehming-Bomkamp, Hannover (DE); Viktoria Pavon Sierra, Hannover (DE); Norbert Mueller, Nienhagen (DE); Michael Radke, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 438 days.

This patent is subject to a terminal disclaimer.

(21) Appl. No.: 16/324,916

(22) PCT Filed: Jul. 17, 2017

(86) PCT No.: PCT/EP2017/067953
§ 371 (c)(1),
(2) Date: Feb. 12, 2019

(87) PCT Pub. No.: WO2018/033316
PCT Pub. Date: Feb. 22, 2018

(65) Prior Publication Data
US 2021/0277210 A1    Sep. 9, 2021

(30) Foreign Application Priority Data
Aug. 17, 2016  (DE) .................... 10 2016 215 344.7

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/03* (2013.01); *C08L 2312/00* (2013.01)

(58) Field of Classification Search
CPC .... C08L 9/06; C08L 2205/02; C08L 2205/03; C08L 2312/00; B60C 1/0016
See application file for complete search history.

(56) References Cited

U.S. PATENT DOCUMENTS

| 4,840,988 | A | 6/1989 | Nakayama et al. |
| 5,432,232 | A | 7/1995 | Hattori et al. |
| 5,959,039 | A | 9/1999 | Yokoyama et al. |
| 6,242,523 | B1 | 6/2001 | Blok et al. |
| 6,426,378 | B1 | 7/2002 | Lickes et al. |
| 6,550,508 | B1 | 4/2003 | Yamaguchi et al. |
| 9,126,457 | B2 | 9/2015 | Kaes et al. |
| 9,631,074 | B2 | 4/2017 | Peters et al. |
| 10,040,925 | B1 | 8/2018 | Schwarzendahl |
| 11,008,446 | B2* | 5/2021 | Recker ...................... C08L 9/06 |
| 11,015,041 | B2* | 5/2021 | Recker .................. B29B 7/7495 |
| 2002/0082333 | A1 | 6/2002 | Herpich et al. |
| 2003/0181599 | A1 | 9/2003 | Inagaki et al. |
| 2003/0195289 | A1 | 10/2003 | Heiliger et al. |
| 2006/0155076 | A1 | 7/2006 | Nakamura et al. |
| 2007/0083011 | A1 | 4/2007 | Pohl et al. |
| 2007/0155890 | A1 | 7/2007 | Chen et al. |
| 2007/0293619 | A1 | 12/2007 | Jacoby et al. |
| 2008/0161452 | A1 | 7/2008 | York et al. |
| 2008/0161460 | A1 | 7/2008 | Fork et al. |
| 2008/0161462 | A1 | 7/2008 | Fork et al. |
| 2008/0161475 | A1 | 7/2008 | York et al. |
| 2009/0137701 | A1 | 5/2009 | Hirabayashi |
| 2009/0137718 | A1 | 5/2009 | Hirabayashi |
| 2010/0006199 | A1 | 1/2010 | Ohta et al. |
| 2010/0108239 | A1 | 5/2010 | Recker et al. |
| 2010/0190885 | A1 | 7/2010 | Hua et al. |
| 2010/0292366 | A1 | 11/2010 | Herzog et al. |
| 2010/0292406 | A1 | 11/2010 | Herzog et al. |

(Continued)

FOREIGN PATENT DOCUMENTS

| DE | 3804908 A1 | 8/1988 |
| DE | 102008058991 A1 | 6/2009 |

(Continued)

OTHER PUBLICATIONS

English-language machine translation of JP-2014231575-A, conducted on Espacenet on Jul. 6, 2021 (38 pages).*
Chunmei Zhang et al., Thermal and Mechanical Properties of Natural Rubber Composites Reinforced with Cellulose Nanocrystals from Southern Pine, 33 Advances in Polymer Technology 21448 (2014). (Year: 2014).*
Cray Valley, Technical Data Sheet: RICON 130, dated May 2010. (Year: 2010).*
International Search Report dated Oct. 17, 2017 of international application PCT/EP2017/067953 on which this application is based.
Kushida N et al. / "Rubber composition used in manufacture of pneumatic tire, comprises specific amount of silica, aromatic modified terpene resin, styrene-butadiene copolymer, and diene-based rubber having preset weight average molecular weight" / Nov. 12, 2014.

(Continued)

*Primary Examiner* — Nicholas E Hill
(74) *Attorney, Agent, or Firm* — David L. Cate; Gregory Adams

(57) ABSTRACT

The invention relates to a rubber blend, to a sulfur-crosslinkable rubber mixture comprising the rubber blend and to a vehicle tire comprising such a rubber mixture. The rubber blend comprises
at least one solution-polymerized diene polymer A of high molecular weight and
at least one solution-polymerized polymer B of low molecular weight,
wherein at least one of polymers A and B has been functionalized at the chain end and/or along the polymer chain and/or at a coupling site with at least one group selected from epoxy groups, hydroxyl groups, carboxyl groups, amino groups, siloxane groups, organosilicon groups, phthalocyanine groups and amino group-containing alkoxysilyl groups.

10 Claims, No Drawings

(56) References Cited

U.S. PATENT DOCUMENTS

| | | |
|---|---|---|
| 2011/0301261 A1 | 12/2011 | Thiele et al. |
| 2012/0157568 A1 | 6/2012 | Sandstrom et al. |
| 2013/0131240 A1 | 5/2013 | Uekita et al. |
| 2013/0289197 A1 | 10/2013 | Pavon Sierra et al. |
| 2014/0256858 A1 | 9/2014 | Bethea et al. |
| 2014/0329930 A1 | 11/2014 | Sato |
| 2015/0031791 A1 | 1/2015 | Sugiura |
| 2015/0126674 A1* | 5/2015 | Sato .................... B60C 1/00 524/526 |
| 2015/0148479 A1 | 5/2015 | Ma |
| 2016/0159147 A1 | 6/2016 | Isitman et al. |
| 2016/0194485 A1 | 7/2016 | Herzog et al. |
| 2016/0208076 A1 | 7/2016 | Puhala et al. |
| 2016/0376428 A1* | 12/2016 | Sandstrom ............ C08L 9/06 523/156 |
| 2018/0037059 A1 | 2/2018 | Hamann et al. |
| 2018/0099527 A1 | 4/2018 | Miyazaki |
| 2018/0171118 A1 | 6/2018 | Yuri |
| 2018/0334521 A1 | 11/2018 | Gruendken et al. |
| 2019/0169407 A1* | 6/2019 | Recker ................. C08C 19/44 |
| 2021/0277212 A1 | 9/2021 | Takagi et al. |
| 2021/0284826 A1 | 9/2021 | Recker et al. |
| 2021/0355302 A1 | 11/2021 | Recker et al. |
| 2021/0363333 A1 | 11/2021 | Recker et al. |

FOREIGN PATENT DOCUMENTS

| | | | |
|---|---|---|---|
| DE | 102008058996 A1 | | 6/2009 |
| DE | 102015210424 A1 | | 12/2016 |
| EP | 1035164 A1 | | 9/2000 |
| EP | 1052270 A1 | | 11/2000 |
| EP | 1535948 A1 | | 6/2005 |
| EP | 1925363 A1 | | 5/2008 |
| EP | 2060604 A1 | | 5/2009 |
| EP | 2589619 A1 | | 5/2013 |
| EP | 2778184 A1 | | 9/2014 |
| EP | 2853558 A1 | | 4/2015 |
| JP | H0665419 A | | 3/1994 |
| JP | 2003327755 A | | 11/2003 |
| JP | 2007254599 A | | 10/2007 |
| JP | 2009512762 A | | 3/2009 |
| JP | 2009256532 A | | 11/2009 |
| JP | 2010280853 A | | 12/2010 |
| JP | 2013082794 A | | 5/2013 |
| JP | 2014231550 A | | 12/2014 |
| JP | 2014231575 A | * | 12/2014 |
| JP | 2015113425 A | | 6/2015 |
| JP | 2015221883 A | | 12/2015 |
| WO | 9909036 A1 | | 2/1999 |
| WO | 2008083241 A2 | | 7/2008 |
| WO | 2008083242 A1 | | 7/2008 |
| WO | 2008083243 A1 | | 7/2008 |
| WO | 2008083244 A1 | | 7/2008 |
| WO | 2009077295 A1 | | 6/2009 |
| WO | 2009077296 A1 | | 6/2009 |
| WO | 2010049216 A2 | | 5/2010 |
| WO | 2010049261 A1 | | 5/2010 |
| WO | 2012084360 A1 | | 6/2012 |
| WO | 2013099324 A1 | | 7/2013 |
| WO | 2018033313 A1 | | 2/2018 |
| WO | 2018033501 A1 | | 2/2018 |
| WO | 2018033508 A1 | | 2/2018 |
| WO | WO-2018050748 A1 | * | 3/2018 ........... B60C 1/0016 |

OTHER PUBLICATIONS

Database WPI / Week 201482 / Nov. 12, 2014.
Sato M et al. / Rubber composition for forming pneumatic tire e.g. winter tire, comprises diene-based rubber having preset weight average molecular weight, low molecular weight butadiene rubber having preset weighht average molecular weight, and silica / Nov. 12, 2014.
Database WPI / Week 200975 / May 9, 2009.
Sprintan SLR 3402-Schkopau-Solution-Styrene Butadiene Rubber (S-SBR) / Publication date Apr. 2015.
Kurarary Liquid Rubber / Publication date April 20178.
Analytical Data for Kuraray LBR-307—Publication date Apr. 2017.
Kidono K. et al. / Rubber composition for tread portion of tire e.g. studless tire, contains rubber composition formed by mixing rubber component having natural rubber and/or synthetic diene rubber and low-molecular-weight conjugated diene-type polymer / May 11, 2009.
Matsuo S; Toyoda M / Rubber composition used for pneumatic tire, comprises solution polymerizable styrene-butadiene copolymer rubber component, Carbon black, silica, inorganic filler and low-molecular weight polymer.

* cited by examiner

RUBBER BLEND, SULFUR-CROSSLINKABLE RUBBER MIXTURE, AND VEHICLE TIRE

The invention relates to a rubber blend, to a sulfur-crosslinkable rubber mixture comprising the rubber blend and to a vehicle tire comprising such a rubber mixture.

Since the running properties of a tire, especially of a pneumatic vehicle tire, depend to a great extent on the rubber composition of the tread, particularly high demands are placed on the composition of the tread mixture. The partial or complete replacement of the carbon black filler with silica in rubber mixtures has brought the running properties to a higher level overall over the past few years. However, the known trade-offs in the tire properties that follow opposite trends still exist in silica-containing tread mixtures as well. For instance, an improvement in wet grip and in dry braking still generally entails a deterioration in rolling resistance, in winter properties and in abrasion characteristics.

A variety of approaches have already been pursued in order to resolve the trade-offs in the tread. For example, a wide variety of different polymers, including modified polymers, resins, plasticizers and finely divided fillers have been used for rubber mixtures, and attempts have been made to influence the vulcanizate properties by modification of the mixture production.

EP 1052270 A discloses, for example, tread mixtures based on carbon black as filler, which for effective grip on ice include among other components a liquid polymer, e.g. polybutadiene.

DE 3804908 A1 likewise discloses tread mixtures based on carbon black as filler, which comprise liquid polybutadiene for good winter properties.

Liquid polybutadiene having a high vinyl content and a high glass transition temperature ($T_g$) is proposed in EP 1035164 A for tire treads as a substitute for conventional plasticizer oils.

WO 2012/084360 A1 also discloses a rubber mixture having improved rolling resistance, which comprises a liquid butadiene rubber alongside a solid styrene-butadiene rubber.

In EP 2 778 184 A1, a polymer mixture is produced from an SSBR of high molecular weight and an SSBR of low molecular weight, where the SSBRs may also have been functionalized. This polymer mixture is used in rubber mixtures for tires.

DE 102008058996 A1 and DE102008058991 A1 disclose, as a substitute for customary plasticizer oils, terminally amine-modified liquid polybutadienes or terminally carboxyl-modified liquid polybutadienes in tread mixtures having a high amount of unfunctionalized synthetic rubber. The tires are said to feature a very good balance between low fuel consumption and good adhesion properties, and the ability to suppress cracking at the base of profile grooves while simultaneously maintaining wear resistance.

EP 2060604 B1 discloses a rubber mixture comprising a functionalized polymer having an $M_W$ of 20 000 g/mol and carbon black as filler in combination with 60 phr of natural rubber.

US 20020082333 A1 improves processability by using a triethoxysilane-modified polybutadiene rather than a silane in an NR-free rubber mixture based on unfunctionalized synthetic rubber and silica as filler.

EP 1 535 948 B1 discloses a styrene-butadiene rubber that bears, as functionalization, polyorganosiloxane groups containing epoxy groups, where three or more polymer chains are joined to one polyorganosiloxane group. The combination of this polymer with an unfunctionalized butadiene rubber in a silica-containing rubber mixture is said to result in improved rolling resistance, abrasion and wet grip properties.

EP 2 853 558 A1 discloses improving rolling resistance and abrasion characteristics in a rubber mixture for vehicle tires by using a styrene-butadiene rubber functionalized with phthalocyanine groups and/or hydroxyl groups and/or epoxy groups and/or silane sulfide groups and having a styrene content of 0% to 12% by weight and having, in the unvulcanized state, a glass transition temperature ($T_g$) according to DSC of −75 to −120° C.

EP 1 925 363 B1 discloses a rubber composition for tires that comprises a modified (functionalized) SBR having a low molecular weight in combination with a modified diene rubber of high molecular weight. This is said to improve rolling resistance among other characteristics.

It is an object of the invention to provide a rubber blend having good processability in rubber mixtures. It is a further object of the invention to provide a rubber mixture which comprises a rubber blend and results in tires having improved winter properties and/or abrasion properties and/or rolling resistance properties without impairing the wet-grip properties.

This object is achieved by a rubber blend composed of
at least one solution-polymerized diene polymer A of high molecular weight, formed from at least one conjugated diene and optionally one or more vinylaromatic compound(s), having a content of vinylaromatic compound of 0% to 50% by weight, having a vinyl content of 8% to 80% by weight based on the diene content, having a glass transition temperature $T_g$ according to DSC of $-100°$ C.$<T_g<+20°$ C., having a molecular weight $M_w$ according to GPC of more than 350 000 g/mol and having a polydispersity PD of 1.1<PD<3 and at least one solution-polymerized polymer B of low molecular weight, formed from at least one conjugated diene,
or at least one conjugated diene and one or more vinylaromatic compound(s)
or at least one or more than one vinylaromatic compound(s)
having a content of vinylaromatic compound of 0% to 100% by weight, having a vinyl content of 8% to 80% by weight based on any diene content present, having a glass transition temperature $T_g$ according to DSC of $-100°$ C.$<T_g<+80°$ C., having a molecular weight $M_w$ according to GPC of 1300 g/mol$<M_w<$10 000 g/mol and having a polydispersity PD of 1<PD<1.5, wherein at least one of polymers A and B has been functionalized at the chain end and/or along the polymer chain and/or at a coupling site with at least one group selected from epoxy groups, hydroxyl groups, carboxyl groups, amino groups, siloxane groups, organosilicon groups, phthalocyanine groups and amino group-containing alkoxysilyl groups.

It has been found that, surprisingly, the aforementioned rubber blend comprising the specific diene polymer A and the specific polymer B has particularly good processability in rubber mixtures. Polymer B acts here like a plasticizer. These good processing characteristics were even manifested in the case of mixtures having a high filler level and having a high plasticizer content (composed of polymer B and further plasticizers present). When the rubber blend was used in a sulfur-cross linkable rubber mixture, an improvement in the trade-off between winter properties/abrasion properties/rolling resistance properties and wet grip properties was achieved in the tires produced with the mixture.

The figure for polydispersity PD used in this document is the quotient of the weight-average molecular weight $M_w$ and the number-average molecular weight $M_n$ of the polymers (PD=$M_w/M_n$).

According to the invention, the rubber blend comprises a diene polymer A of high molecular weight, which would generally be a solid rubber on its own at room temperature, and a polymer B of low molecular weight, which would generally be liquid on its own at room temperature.

The solution-polymerized diene polymer A of high molecular weight, formed from at least one conjugated diene and optionally one or more vinylaromatic compounds, may be a wide variety of different diene polymers based, for example, on butadiene, isoprene and styrene. If the diene polymer A contains substituted conjugated diene units, the figure for the vinyl content is based on equivalents, for example on the 3,4-bonded components in the case of isoprene units, whereas, in the presence of butadiene units, the figure for the vinyl content is based on the 1,2-bonded components.

Preferably, the diene polymer A is polybutadiene or styrene-butadiene rubber (styrene-butadiene copolymer).

The rubber blend of the invention further comprises a solution-polymerized polymer B of low molecular weight, formed from at least one conjugated diene or at least one conjugated diene and one or more vinylaromatic compound(s) or at least one or more than one vinylaromatic compound(s). This may, for example, be liquid polybutadiene of low molecular weight, styrene-butadiene copolymers of low molecular weight or resin-like compounds based on vinylaromatic compounds.

It is essential to the invention that at least one of polymers A and B has been functionalized at the chain end and/or along the polymer chain and/or at a coupling site with at least one group selected from epoxy groups, hydroxyl groups, carboxyl groups, amino groups, siloxane groups, organosilicon groups, phthalocyanine groups and amino group-containing alkoxysilyl groups. With regard to the functionalization, it is possible that multiple polymer chains are attached to one functionalization site or one coupling site. The functionalizations enable optimal processibility in a rubber mixture and result in a good filler-polymer interaction in the rubber mixtures, which ultimately results in an improved profile of properties.

The rubber blends of the invention may be produced by methods known to those skilled in the art. For example, the diene polymer A and the polymer B may be produced separately from one another by anionic polymerization in organic solvent with later dosage of functionalization reagents. In that case, the two reaction solutions are combined and processed together to give a rubber blend without solvent (removal of solvent, for example, by distillation or vacuum evaporation), so as to obtain an efficiently transportable and processible blend.

In a preferred development of the invention, at least the solution-polymerized polymer B of low molecular weight has been functionalized with the groups specified. In this way, it is possible to achieve good distribution of polymer B in the polymer matrix, and fillers can be well incorporated.

It is particularly preferable when the solution-polymerized diene polymer A of high molecular weight has been functionalized as well. This further improves the processibility and positive effect on the properties of the resulting rubber mixtures.

Polymers A and B have been functionalized with different groups. These may, for example, be organosilicon groups of the following structure I):

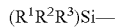
$$(R^1R^2R^3)Si— \qquad\qquad\qquad I)$$

where $R^1$, $R^2$, $R^3$ in the structures may be the same or different and may be selected from linear or branched alkoxy, cycloalkoxy, alkyl, cycloalkyl or aryl groups having 1 to 20 carbon atoms, and where the functionalization of formula I) is attached to the polymer chain of the polymer directly or via a bridge and where the bridge consists of a saturated or unsaturated carbon chain which may also contain cyclic and/or aliphatic and/or aromatic elements and heteroatoms in or on the chain. The $R^1$, $R^2$, $R^3$ radicals are preferably alkoxy groups, e.g. ethoxy groups. If the structure I) is bonded to the polymer via a bridge, the bridge may, for example, be the attachment of the following structure II):

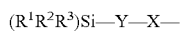
$$(R^1R^2R^3)Si—Y—X— \qquad\qquad II)$$

where, in formula II), Y is an alkyl chain (—$CH_2$)$_n$— with n=1 to 8 and X is a functional group selected from the group consisting of ester, ether, urethane, urea, amine, amide, thioether and thioester. X and Y here form the bridge.

In order to obtain particularly good properties in the resulting rubber mixtures, it has been found to be advantageous when at least one of polymers A and B has been functionalized at the chain end with an amino group-containing alkoxysilyl group and at least one further amino group and/or at least one further alkoxysilyl group and/or at least one further amino group-containing alkoxysilyl group, where the amino groups are bonded to the chain end of the polymer chain with or without spacers.

It is also preferred when at least one of the polymers A and B has been functionalized at the chain end and/or along the polymer chain and/or at a coupling site with a siloxane group. Siloxane groups of this kind are disclosed, for example, in WO 2009077295 A1 and WO 2009077296 A1.

In a preferred development of the invention, at least one of polymers A and B has a coupling site. These coupling sites may, for example, be tin (Sn) or silicon (Si).

In order to obtain a rubber blend of particularly good processibility, it has been found to be advantageous when the rubber blend includes 5 to 100 phr (based on the at least one solution-polymerized diene polymer A of high molecular weight) of the at least one solution-polymerized polymer B of low molecular weight. It may thus have a weight ratio of diene polymer A to polymer B of up to 1:1.

The unit "phr" (parts per hundred parts of rubber by weight) used in this document is the standard unit of amount for blend recipes in the rubber industry. The dosage of the parts by weight of the individual substances is based in this document on 100 parts by weight of the total mass of all rubbers of high molecular weight, which are thus generally solid, that are present in the mixture or blend. The polymer B having an $M_w$ of 1300 to 10 000 g/mol which is present in accordance with the invention is therefore not included as rubber in the hundred parts for the phr calculation.

The processing characteristics can be further improved in that the rubber blend has a Mooney viscosity (ML1+4, 100° C. according to ASTM-D 1646) of 40 to 100 Mooney units.

The sulfur-crosslinkable rubber mixture having the improved winter properties and/or abrasion properties and/or rolling resistance properties without impairments in wet grip properties when used in vehicle tires comprises the rubber blend as claimed in claim 1 and 30 to 300 phr, preferably 20 to 250 phr, more preferably 20 to 150 phr and most preferably 80 to 110 phr of at least one silica. The presence of at least one functionalized polymer A or B can result in an optimal distribution of the silica in the polymer matrix, with the simultaneous possibility of good attachment of the silica to the polymers via the functional groups. This leads to an improved profile of properties.

The silica present may be any of the types of silica known to those skilled in the art that are typically suitable as filler for tire rubber mixtures. However, particular preference is given to using a finely divided, precipitated silica which has a nitrogen surface area (BET surface area) (in accordance with DIN ISO 9277 and DIN 66132) of 35 to 400 m$^2$/g, preferably 35 to 350 m$^2$/g, more preferably 100 to 320 m$^2$/g and most preferably 120 to 235 m$^2$/g, and a CTAB surface area (in accordance with ASTM D 3765) of 30 to 400 m$^2$/g, preferably 50 to 330 m$^2$/g, more preferably 100 to 300 m$^2$/g and most preferably 110 to 230 m$^2$/g. Such silicas lead, for example in rubber mixtures for tire treads, to particularly good physical properties of the vulcanizates. In addition, advantages can arise in processing of the mixture as a result of a reduction in the mixing time while maintaining the same product properties that lead to improved productivity. Silicas used may thus, for example, be either those of the Ultrasil® VN3 type (trade name) from Evonik or highly dispersible silicas known as HD silicas (e.g. Zeosil® 1165 MP from Solvay).

The rubber mixture may comprise further rubbers as well as the inventive rubber blend. These further rubbers may be selected from the group consisting of natural polyisoprene, synthetic polyisoprene, butadiene rubber, solution-polymerized styrene-butadiene rubber, emulsion-polymerized styrene-butadiene rubber, halobutyl rubber, polynorbornene, isoprene-isobutylene copolymer, ethylene-propylene-diene rubber, nitrile rubber, chloroprene rubber, acrylate rubber, fluoro rubber, silicone rubber, polysulfide rubber, epichlorohydrin rubber, styrene-isoprene-butadiene terpolymer, hydrogenated acrylonitrile-butadiene rubber, isoprene-butadiene copolymer and hydrogenated styrene-butadiene rubber.

The further rubbers are preferably at least one diene rubber.

Diene rubbers refer to rubbers that result from polymerization or copolymerization of dienes and/or cycloalkenes and thus have C=C double bonds either in the main chain or in the side groups.

The at least one diene rubber is preferably selected from the group consisting of synthetic polyisoprene (IR) and natural polyisoprene (NR) and styrene-butadiene rubber (SBR) and polybutadiene (BR).

The natural and/or synthetic polyisoprene of all embodiments may be either cis-1,4-polyisoprene or 3,4-polyisoprene. However, the use of cis-1,4-polyisoprenes with a cis-1,4 content >90% by weight is preferred. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

In addition, a mixture of one or more natural polyisoprenes with one or more synthetic polyisoprenes is also conceivable.

The butadiene rubber (=BR, polybutadiene) may be any type known to those skilled in the art. These include so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalyzed butadiene rubber) having a cis content of 20% to 50% by weight. A high-cis BR achieves particularly good abrasion properties and low hysteresis of the rubber mixture.

The styrene-butadiene rubber as further rubber may be either solution-polymerized styrene-butadiene rubber (SSBR) or emulsion-polymerized styrene-butadiene rubber (ESBR), and it is also possible to use a mixture of at least one SSBR and at least one ESBR. The terms "styrene-butadiene rubber" and "styrene-butadiene copolymer" are used synonymously in the context of the present invention.

Preferably, the proportion of the diene polymer A in the rubber blend in the rubber mixture is at least 50 phr based on the total amount of the solid rubbers present in the rubber mixture, where—as already mentioned—the polymer B of low molecular weight is not included in the determination of the hundred parts by weight for the phr basis.

As well as the silica, the rubber mixture may comprise further fillers known to the person skilled in the art in customary amounts. These may be carbon black or other fillers, for example aluminosilicates, kaolin, chalk, starch, magnesium oxide, titanium dioxide, rubber gels, fibers (for example aramid fibers, glass fibers, carbon fibers, cellulose fibers), carbon nanotubes (CNTs, including discrete CNTs, hollow carbon fibers (HCFs) and modified CNTs containing one or more functional groups, such as hydroxyl, carboxyl and carbonyl groups), graphite and graphenes, and carbon-silica dual-phase filler.

Possible carbon blacks are all types of carbon black known to a person familiar with the technical field.

In one embodiment, the carbon black has an iodine number in accordance with ASTM D 1510, which is also referred to as iodine adsorption number, between 30 g/kg and 250 g/kg, preferably 30 to 180 g/kg, more preferably 40 to 180 g/kg, and most preferably 40 to 130 g/kg, and a DBP number in accordance with ASTM D 2414 of 30 to 200 mL/100 g, preferably 70 to 200 mL/100 g, more preferably 90 to 200 mL/100 g.

The DBP number in accordance with ASTM D 2414 determines the specific absorption volume of a carbon black or a light-colored filler by means of dibutyl phthalate. The use of such a type of carbon black in the rubber mixture, in particular for vehicle tires, ensures the best possible compromise between abrasion resistance and heat buildup, which in turn influences the ecologically relevant rolling resistance. Preference is given here to only one type of carbon black being used in the respective rubber mixture, but it is also possible to mix various types of carbon black into the rubber mixture. But the total amount of carbon blacks present corresponds to a maximum of 300 phr.

In a preferred development of the invention, the rubber mixture contains 0.1 to 20 phr of carbon black. Given these small amounts of carbon black, with the best tire properties with regard to rolling resistance and wet grip were achieved.

To further improve processibility and to attach the silica and any other polar fillers present to diene rubber, silane coupling agents may be used in rubber mixtures. It is possible here to use one or more different silane coupling agents in combination with one another. The rubber mixture may thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. Silane coupling agents used may be any silane coupling agents known to those skilled in the art for use in rubber mixtures. Such coupling agents known from the prior art are bifunctional organosilanes which have at least one alkoxy, cycloalkoxy or phenoxy group as leaving group on the silicon atom and have, as other functionality, a group which can, optionally after dissociation, undergo a chemical reaction with the double bonds of the polymer. The latter group may, for example, be the following chemical groups: —SCN, —SH, —NH$_2$ or —SX (with x=2 to 8).

For example, silane coupling agents used may be 3-mercaptopropyltriethoxysilane, 3-thiocyanatopropyltrimethoxysilane or 3,3'-bis(triethoxysilylpropyl) polysulfides having 2 to 8 sulfur atoms, e.g. 3,3'-bis(triethoxysilylpropyl) tetrasulfide (TESPT), the corresponding disulfide (TESPD), or else mixtures of the sulfides having 1 to 8 sulfur atoms and different contents of the various sulfides. TESPT can, for example, also be added as a mixture with industrial carbon black (X50S® trade name from Evonik). Blocked mercaptosilanes, as are known, for example, from WO 99/09036, can also be used as silane coupling agent. It is also possible to use silanes as described in WO 2008/083241 A1, WO 2008/083242 A1, WO 2008/083243 A1 and WO 2008/083244 A1. It is possible to use, for example, silanes which are marketed under the NXT name in a number of variants from Momentive, USA, or those that are marketed under the VP Si 363® name by Evonik Industries.

In a preferred embodiment of the invention, the rubber mixture contains a 3,3'-bis(triethoxysilylpropyl) polysulfide having 2 to 8 sulfur atoms as silane, preferably a mixture comprising 70% to 80% by weight of 3,3'-bis(triethoxysilylpropyl) disulfide.

In a further preferred embodiment of the invention, the rubber mixture comprises at least one blocked and/or unblocked mercaptosilane.

What are meant by unblocked mercaptosilanes are silanes which have an —S—H group, i.e. a hydrogen atom on the sulfur atom. What are meant by blocked mercaptosilanes are silanes which have an S-PG group, where PG is the abbreviation for a protecting group on the sulfur atom. Preferred protecting groups are acyl groups. The blocked mercaptosilane used is preferably 3-octanoylthio-1-propyltriethoxysilane.

The amount of coupling agent is preferably 0.1 to 20 phf, more preferably 1 to 15 phf.

The expression phf (parts per hundred parts of filler by weight) used in this text is the conventional unit of amount for coupling agents for fillers in the rubber industry. In the context of the present application, phf relates to the silica present, meaning that any other fillers present, such as carbon black, are not included in the calculation of the amount of silane.

In addition, the rubber mixture may contain further activators and/or agents for the binding of fillers, in particular carbon black. The latter may, for example, be the compound S-(3-aminopropyl)thiosulfuric acid as disclosed, for example, in EP 2589619 A1, and/or metal salts thereof, which gives rise to very good physical properties of the rubber mixture especially in combination with at least one carbon black as filler.

The silanes and activators mentioned are added in the production of the rubber mixture preferably in at least one masterbatch mixing stage.

The rubber mixture of the invention may contain up to 150 phr, preferably 80 phr, of at least one plasticizer.

The plasticizers used in the context of the present invention include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL) preferably having a content of polycyclic aromatics of less than 3% by weight according to method IP 346 or rapeseed oil or factices or plasticizer resins or further liquid polymers other than polymer B. The plasticizer(s) is/are preferably added in at least one masterbatch-mixing stage in the production of the rubber mixture of the invention.

Furthermore, the rubber mixture of the invention may comprise standard additives in customary proportions by weight. These additives include a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), N,N'-bis-(1,4-dimethylpentyl)-p-phenylenediamine (77PD), b) activators, for example zinc oxide and fatty acids (e.g. stearic acid), c) waxes, d) resins, especially tackifying resins, e) mastication aids such as 2,2'-dibenzamidodiphenyl disulfide (DBD) and f) processing aids, for example fatty acid salts, for example zinc soaps, and fatty acid esters and derivatives thereof.

Particularly when the rubber mixture of the invention is used for the internal components of a tire or an industrial rubber article which come into direct contact with strengthening elements present, a suitable bonding system, often in the form of tackifying resins, is generally also added to the rubber mixture.

The proportion of the total amount of further additives is 3 to 150 phr, preferably 3 to 100 phr and more preferably 5 to 80 phr.

The total proportion of the further additives includes 0.1 to 10 phr, preferably 0.2 to 8 phr, more preferably 0.2 to 4 phr, of zinc oxide (ZnO).

This may be any type of zinc oxide known to those skilled in the art, for example ZnO pellets or powder. The conventionally used zinc oxide generally has a BET surface area of less than 10 m$^2$/g. However, it is also possible to use what is called nano-zinc oxide having a BET surface area of 10 to 60 m$^2$/g.

The vulcanization is optionally carried out in the presence of sulfur and/or sulfur donors and with the aid of vulcanization accelerators, with some vulcanization accelerators simultaneously being able to act as sulfur donors.

Sulfur and/or further sulfur donors and also one or more accelerators are added to the rubber mixture in customary amounts in the last mixing step. The accelerator is selected from the group consisting of thiazole accelerators, mercapto accelerators and/or sulfenamide accelerators, thiocarbamate accelerators, thiuram accelerators, thiophosphate accelerators, thiourea accelerators, xanthogenate accelerators and guanidine accelerators. Preference is given to using at least one sulfenamide accelerator selected from the group consisting of N-cyclohexyl-2-benzothiazolesulfenamide (CBS), N,N-dicyclohexylbenzothiazole-2-sulfenamide (DCBS), benzothiazyl-2-sulfenomorpholide (MBS) and N-tert-butyl-2-benzothiazylsulfenamide (TBBS), and/or a guanidine accelerator, e.g. diphenylguanidine (DPG).

Sulfur donor substances used may be any sulfur donor substances known to those skilled in the art. If the rubber mixture comprises a sulfur donor substance, it is preferably selected from the group consisting of, for example, thiuram disulfides, for example tetrabenzylthiuram disulfide (TBzTD), tetramethylthiuram disulfide (TMTD), tetraethylthiuram disulfide (TETD), bis[3-(triethoxysilyl)propyl] tetrasulfide (TESPT), thiuram tetrasulfides, for example dipentamethylenethiuram tetrasulfide (DPTT), dithiophosphates, for example DipDis (bis(diisopropyl)thiophosphoryl disulfide), bis(O,O-2-ethylhexylthiophosphoryl) polysulfide (e.g. Rhenocure SDT 50®, Rheinchemie GmbH), zinc dichloryldithiophosphate (e.g. Rhenocure ZDT/S®, Rheinchemie GmbH), zinc alkyldithiophosphate, 1,6-bis(N,N-dibenzylthiocarbamoyldithio)hexane, diaryl polysulfides and dialkyl polysulfides.

Further network-forming systems as obtainable, for example, under the Vulkuren®, Duralink® or Perkalink® trade names or network-forming systems as described in WO 2010/049216 A2 can also be used in the rubber mixture. This system contains a vulcanizing agent which crosslinks with a functionality of greater than four and at least one vulcanization accelerator.

In addition, vulcanization retarders may be present in the rubber mixture.

The sulfur-crosslinkable rubber mixture according to the invention is produced by the process customary in the rubber industry in which initially, in one or more mixing stages, a preliminary mixture comprising all constituents except the vulcanization system (sulfur and vulcanization-influencing substances) is produced. The final mixture is produced by adding the vulcanization system in a final mixing stage. The final mixture is processed further, for example, by an extrusion operation and converted to the appropriate shape. This is followed by further processing by vulcanization, wherein owing to the vulcanization system added in the context of the present invention sulfur crosslinking takes place.

The rubber mixture may be used for a wide variety of different rubber articles, such as bellows, conveyor belts, air springs, cords, belts, hoses or footwear soles.

However, the rubber mixture preferably finds use in vehicle tires, which is understood to mean pneumatic vehicle tires and all-rubber tires, including tires for industrial and construction site vehicles, trucks, cars and two-wheeled vehicle tires.

The rubber mixture of the invention may be used in different components of vehicle tires, especially pneumatic vehicle tires. This may, for example, be the sidewall, the flange profile and internal tire components. However, preference is given to using the rubber mixture for the part of the tread of a vehicle tire that comes into contact with the driving surface. This affords tires that feature improved winter properties and/or abrasion properties and/or rolling resistance properties without impairment of wet grip properties.

The tread may consist entirely or only partly of the rubber mixture. For example, the tread may have a cap/base construction, where only the cap or only the base may consist of the rubber mixture as claimed in claim 1. In the context of the present invention, "cap" is understood to mean the part of the tread that comes into contact with the road, being arranged radially on the outside (upper tread portion or tread cap). In the context of the present invention, "base" is understood to mean the part of the tread arranged radially on the inside, and hence does not come into contact with the road in driving operation, or does so only at the end of the tire lifetime (lower tread portion or tread base).

The rubber mixture of the invention is additionally also suitable for treads consisting of various tread mixtures arranged alongside one another and/or one on top of another (multicomponent tread).

In the production of the vehicle tires, the mixture is extruded in the shape of the desired component and applied to the tire blank by known methods. It is also possible that the component is produced by the winding of a narrow strip of rubber mixture. Subsequently, the tire is vulcanized under standard conditions.

The invention will now be illustrated in detail by comparative examples and working examples.

Production of the Rubber Blend of the Invention:

Copolymerization of 1,3-Butadiene with Styrene (Diene Polymer A)

The copolymerization was conducted in a jacketed 40 L steel reactor that was purged with nitrogen prior to the addition of the organic solvent, the monomers, the polar coordinator compound, the initiator compound and other components. The following components were added in the sequence specified: cyclohexane solvent (18 560 g), butadiene monomer (1777 g), styrene monomer (448 g) and tetramethylethylenediamine (TMEDA, 1.0 g), and the mixture was heated to 40° C., followed by titration with n-butyllithium to remove traces of moisture or other impurities. n-BuLi (14.08 mmol) was added to the polymerization reactor to initiate the polymerization reaction. The polymerization was conducted for 20 min, in the course of which the polymerization temperature was not allowed to rise to more than 70° C. Then butadiene (1202 g) and styrene (91 g) as monomers were added over the course of 55 min. The polymerization was conducted for a further 20 min, followed by the addition of 63 g of butadiene monomer. After 20 min, the polymerization was stopped by adding hexamethylcyclotrisiloxane (D3) for functionalization (0.5 equivalent based on the initiator). The resultant polymer has been siloxane group-functionalized. 0.25% by weight of IRGANOX 1520, BASF, based on the total monomer weight, was added to the polymer solution as stabilizer. This mixture was stirred for 10 min.

For preparation of the unfunctionalized polymer A-1, rather than hexamethylcyclotrisiloxane (D3), the polymerization reaction was ended by addition of methanol.

Copolymerization of 1,3-Butadiene with Styrene (Polymer B of Low Molecular Weight)

The copolymerization was conducted in a jacketed 5 L steel reactor that was purged with nitrogen prior to the addition of the organic solvent, the monomers, the polar coordinator compound, the initiator compound and other components. The following components were added in the sequence specified: cyclohexane solvent (3000 g), tetrahydrofuran (45 g), butadiene monomer (375 g), styrene monomer (125 g), and the mixture was heated to 25° C., followed by titration with n-butyllithium to remove traces of moisture or other impurities. n-BuLi (5.6 g) was added to the polymerization reactor to initiate the polymerization reaction. The polymerization was conducted for 15 min, in the course of which the polymerization temperature was not allowed to rise to more than 70° C. After 15 min, the polymerization was stopped by adding hexamethylcyclotrisiloxane (D3) for functionalization (0.5 equivalent based on the initiator). The resultant polymer has been siloxane group-functionalized. 0.25% by weight of IRGANOX® 1520, BASF, based on the total monomer weight, was added to the polymer solution as stabilizer. This mixture was stirred for 10 min.

For preparation of the unfunctionalized comparative polymer B-1, rather than hexamethylcyclotrisiloxane (D3), the polymerization reaction is ended by addition of methanol.

Table 1 lists the analytical data for polymers A and B.

TABLE 1

| | $M_w$ [g/mol] | $M_n$ [g/mol] | Mooney viscosity | Vinyl content [% by wt.] | Styrene content [% by wt.] | $T_g$ [°C.] |
|---|---|---|---|---|---|---|
| Diene polymer A (functionalized) | 436080 | 396421 | 92.5 | 29.3 | 15.0 | −60.5 |
| Diene polymer A-1 (unfunctionalized) | 438020 | 393900 | 95.3 | 29.2 | 15.1 | −60.6 |
| Polymer B-1 (unfunctionalized) | 9450 | 7800 | n. d. | 66.0 | 25.0 | −32 |
| Polymer B | 9450 | 7800 | n. d. | 66.0 | 25.0 | −32 |

The polymer solutions of diene polymer A or A-1 and 2.149 mixtures of polymer B or B-1 were combined in various combinations. This was followed by stripping with steam in order to remove solvents and other volatile substances, and drying in an oven at 70° C. for 30 min and then additionally at room temperature for three days. The rubber blends obtained in this way contained, based on 100 parts of the diene polymer A or A-1 and 30 parts (phr) of polymer B or B-1. Table 2 lists the analytical data for the rubber blends.

For preparation of the pure polymers A/B or A-1/B-1, the polymer solutions were worked up directly from the mixtures for preparation of these components, i.e. without combination with any other polymer solution.

TABLE 2

| | Content of polymer A (phr) | Content of polymer A-1 (phr) | Content of polymer B (phr) | Content of polymer B-1 (phr) | Mooney viscosity (ML 1 + 4) (MU) |
|---|---|---|---|---|---|
| Rubber blend V | 0 | 100 | 0 | 30 | 61 |
| Rubber blend E-1 | 100 | 0 | 0 | 30 | 62 |
| Rubber blend E-2 | 0 | 100 | 30 | 0 | 62 |
| Rubber blend E-3 | 100 | 0 | 30 | 0 | 65 |

The rubber blends were used to create the rubber mixtures in table 3. As a comparison, a rubber mixture V(5) with the rubber blend V composed of the unfunctionalized polymers A-1 and B-1 and rubber mixtures V(1) to V(4) with no rubber blend but with the polymers A or A-1 and B or B-1 that have been worked up and functionalized separately have been prepared in table 3.

TABLE 3

| Constituents | Unit | V1 | V2 | V3 | V4 | V5 | E1 | E2 | E3 |
|---|---|---|---|---|---|---|---|---|---|
| BR[a] | phr | 20 | 20 | 20 | 20 | 20 | 20 | 20 | 20 |
| Polymer A | phr | 80 | — | 80 | — | — | — | — | — |
| Polymer A-1 | phr | — | 80 | — | 80 | — | — | — | — |
| Blend V | phr | — | — | — | — | 104 | — | — | — |
| Blend E-1 | phr | — | — | — | — | — | 104 | — | — |
| Blend E-2 | phr | — | — | — | — | — | — | 104 | — |
| Blend E-3 | phr | — | — | — | — | — | — | — | 104 |
| N339 carbon black | phr | 9 | 9 | 9 | 9 | 9 | 9 | 9 | 9 |
| Silica[e] | phr | 90 | 90 | 90 | 90 | 90 | 90 | 90 | 90 |
| Silane[f] | phr | 6.5 | 6.5 | 6.5 | 6.5 | 6.5 | 6.5 | 6.5 | 6.5 |
| Polymer B-1 | phr | 24 | 24 | — | — | — | — | — | — |
| Polymer B | phr | — | — | 24 | 24 | — | — | — | — |
| ZnO | phr | 2 | 2 | 2 | 2 | 2 | 2 | 2 | 2 |
| Aging stabilizer/antiozonant/stearic acid | phr | 5 | 5 | 5 | 5 | 5 | 5 | 5 | 5 |
| Processing auxiliary[j] | phr | 3 | 3 | 3 | 3 | 3 | 3 | 3 | 3 |
| DPG | phr | 2 | 2 | 2 | 2 | 2 | 2 | 2 | 2 |
| CBS | phr | 2.6 | 2.6 | 2.6 | 2.6 | 2.6 | 2.6 | 2.6 | 2.6 |
| Sulfur | phr | 2.1 | 2.1 | 2.1 | 2.1 | 2.1 | 2.1 | 2.1 | 2.1 |

[a]BR with cis content greater than 80% by weight;
[e] Zeosil 1165MP, from Rhodia (BET 149 m²/g, CTAB 154 m²/g);
[f]TESPD Si261, from Evonik;
[j]Aktiplast TS, from Rheinchemie The test results summarized in table 4 were ascertained on 195/65 R15 size tires with the ContiWinterContact TS830 profile. For this purpose, the rubber mixture for the tread of the tire in each case was produced analogously to the compositions shown in table 3. All results are reported as a relative assessment based on 100% for tire V2. Values exceeding 100% are superior to comparative tire V2 and represent an improvement.

The ABS wet braking characteristics were determined by the braking distance from 80 km/h on a wet driving surface.

The ABS dry braking characteristics were determined by the braking distance from to 100 km/h on a dry driving surface.

Rolling resistance corresponds to the rolling resistance force measured on the corresponding machine at 90 km/h.

The abrasion values are the weight loss of the tire after driving for 10 000 kilometers.

TABLE 4

| Tire property | V1 | V2 | V3 | V4 | V5 | E1 | E2 | E3 |
|---|---|---|---|---|---|---|---|---|
| ABS dry braking | 100 | 100 | 101 | 102 | 102 | 102 | 103 | 105 |

TABLE 4-continued

| Tire property | V1 | V2 | V3 | V4 | V5 | E1 | E2 | E3 |
|---|---|---|---|---|---|---|---|---|
| ABS wet braking | 100 | 100 | 102 | 100 | 100 | 100 | 102 | 101 |
| Rolling resistance | 102 | 100 | 102 | 102 | 102 | 106 | 106 | 110 |
| Abrasion | 103 | 100 | 103 | 102 | 104 | 110 | 110 | 110 |
| Processing | — | o | — | — | o | o | o | — |

Table 4 shows that the use of an inventive rubber blend achieves a distinct improvement with regard to rolling resistance and abrasion; see E1 to E3. Dry braking characteristics remain virtually unaffected thereby or are likewise slightly improved. As can also be seen, however, these advantages arise only when one constituent of the rubber blend E has been functionalized. The mixtures containing the inventive rubber blends also have advantages in processing characteristics (o=good, -=with difficulties, - -=with considerable difficulties) over the remaining mixtures.

The invention claimed is:

1. A rubber blend comprising:
    at least one solution-polymerized diene polymer A of high molecular weight, formed from at least one conjugated diene and one or more optional vinylaromatic compound(s), wherein the one or more optional vinylaromatic compound(s) has a vinylaromatic content of 0% to 50% by weight, a vinyl content of 8% to 80% by weight based on any diene content present, and wherein the at least one solution-polymerized diene polymer A has a glass transition temperature Tg according to DSC of $-100°$ C.$<$Tg$<+20°$ C., a molecular weight Mw according to GPC of more than 350 000 g/mol and a polydispersity PD of $1.1<$PD$<3$; and
    at least one solution-polymerized polymer B of low molecular weight, formed from at least one conjugated diene, at least one conjugated diene and one or more vinylaromatic compound(s), or at least one or more vinylaromatic compound(s), wherein the one or more vinylaromatic compound(s) has a vinylaromatic content of 0% to 100% by weight, a vinyl content of 8% to 80% by weight based on any diene content present, and wherein the at least one solution-polymerized polymer B has a glass transition temperature Tg according to DSC of $-100°$ C.$<$Tg$<+80°$ C., a molecular weight Mw according to GPC of 1300 g/mol$<$Mw$<10$ 000 g/mol and a polydispersity PD of $1<$PD$<1.5$;
    wherein at least the solution-polymerized polymer B of low molecular weight has been functionalized at the chain end and/or along the polymer chain and/or at a coupling site with at least one group selected from epoxy groups, hydroxyl groups, carboxyl groups, amino groups, siloxane groups, organosilicon groups, phthalocyanine groups and amino group-containing alkoxysilyl groups; and, provided the rubber blend is free of high-cis butadiene rubber.

2. The rubber blend as claimed in claim 1, wherein at least one of the polymers A and B has been functionalized at the chain end and/or along the polymer chain and/or at a coupling site with a siloxane group.

3. The rubber blend as claimed in claim 1, wherein at least one of the polymers A and B has coupling sites.

4. The rubber blend as claimed in claim 1 comprising 5 to 100 phr of the at least one solution-polymerized polymer B of low molecular weight, based on the at least one solution-polymerized diene polymer A of high molecular weight.

5. The rubber blend as claimed in claim 1 having a Mooney viscosity (ML1+4, 100° C. according to ASTM-D 1646) of 40 to 100 Mooney units.

6. A sulfur-crosslinkable rubber mixture comprising the rubber blend as claimed in claim 1 and 30 to 300 phr of silica.

7. The rubber mixture as claimed in claim 6, wherein the proportion of the diene polymer A of the rubber blend in the rubber mixture is at least 50 phr based on the total amount of solid rubbers present in the rubber mixture.

8. The rubber mixture as claimed in claim 6, comprising 0.1 to 20 phr of carbon black.

9. A vehicle tire in which at least one component includes the rubber mixture as claimed in claim 6.

10. The vehicle tire as claimed in claim 9, wherein at least the part of a tread that comes into contact with a driving surface comprises the rubber mixture.

* * * * *